(12) United States Patent
Tatzel (10) Patent No.: US 12,539,564 B2
(45) Date of Patent: Feb. 3, 2026

(54) METHOD AND DEVICE FOR DEMONSTRATING THE INFLUENCE OF CUTTING PARAMETERS ON A CUT EDGE

(71) Applicant: TRUMPF Werkzeugmaschinen SE + Co. KG, Ditzingen (DE)

(72) Inventor: Leonie Felica Tatzel, Korntal (DE)

(73) Assignee: TRUMPF Werkzeugmaschinen SE + Co. KG, Ditzingen (DE)

( * ) Notice: Subject to any disclaimer, the term of this patent is extended or adjusted under 35 U.S.C. 154(b) by 795 days.

(21) Appl. No.: 17/861,925

(22) Filed: Jul. 11, 2022

(65) Prior Publication Data

US 2022/0339739 A1    Oct. 27, 2022

Related U.S. Application Data

(63) Continuation of application No. PCT/EP2021/077086, filed on Oct. 1, 2021.

(30) Foreign Application Priority Data

Oct. 2, 2020    (DE) ............... 10 2020 212 510.4

(51) Int. Cl.
*B23K 26/38* (2014.01)
*B23K 26/03* (2006.01)
(Continued)

(52) U.S. Cl.
CPC ............ *B23K 26/38* (2013.01); *B23K 26/032* (2013.01); *B23K 31/006* (2013.01);
(Continued)

(58) Field of Classification Search
CPC ....... B23K 26/38; B23K 31/006; G06N 3/064
See application file for complete search history.

(56) References Cited

U.S. PATENT DOCUMENTS 10,664,767 B2    5/2020    Takigawa et al.
2013/0178952 A1    7/2013    Wersborg et al.
(Continued)

FOREIGN PATENT DOCUMENTS

| CN | 105057899 A | 11/2015 |
|---|---|---|
| CN | 107272015 A | 10/2017 |

(Continued)

OTHER PUBLICATIONS

Verification of the Nonparametric Characteristics of Backpropagation Neural Networks for Image, Zhou et al., Classification (Year: 1999).*

(Continued)

*Primary Examiner* — Woody A Lee, Jr.
(74) *Attorney, Agent, or Firm* — Laurence A. Greenberg; Werner H. Stemer; Ralph E. Locher (57) ABSTRACT

A method for recognizing cutting parameters which are particularly important for specific features of a cut edge. A recording of the cut edge is analyzed by an algorithm having a neural network for determining the cutting parameters. Those recording pixels which play a significant part for ascertaining the cutting parameters are identified by back-propagation of this analysis. An output in the form of a representation of these significant recording pixels, in particular in the form of a heat map, demonstrates to a user of the method which cutting parameters need to be changed in order to improve the cut edge. A computer program product and a device for carrying out the method.

17 Claims, 5 Drawing Sheets

(51) Int. Cl.
  *B23K 31/00* (2006.01)
  *G05B 19/4155* (2006.01)
  *G06N 3/084* (2023.01)
(52) U.S. Cl.
  CPC ......... *G05B 19/4155* (2013.01); *G06N 3/084* (2013.01); *G05B 2219/36199* (2013.01)

(56) References Cited

U.S. PATENT DOCUMENTS

| | | |
|---|---|---|
| 2013/0184839 A1 | 7/2013 | Bauer et al. |
| 2014/0294284 A1 | 10/2014 | Bryll |
| 2019/0351512 A1 | 11/2019 | Izumi |
| 2020/0285711 A1* | 9/2020 | Zimanyi ............... G06N 3/10 |
| 2021/0245295 A1 | 8/2021 | Fahrni et al. |
| 2021/0245298 A1 | 8/2021 | Kiefer et al. |
| 2022/0011240 A1 | 1/2022 | Schwarz |
| 2022/0019870 A1 | 1/2022 | Gu |
| 2022/0043421 A1 | 2/2022 | Wittwer |

FOREIGN PATENT DOCUMENTS

| | | |
|---|---|---|
| CN | 108340088 A | 7/2018 |
| CN | 108875740 A | 11/2018 |
| CN | 109014626 A | 12/2018 |
| DE | 102014205726 A1 | 10/2014 |
| DE | 102017105224 A1 | 9/2017 |
| DE | 102019112379 A1 | 11/2019 |
| DE | 102018216873 A1 | 4/2020 |
| DE | 102018129425 A1 | 5/2020 |
| EP | 3654248 A1 | 5/2020 |
| JP | 2020121338 A | 8/2020 |
| WO | 2012000995 A1 | 1/2012 |
| WO | 2020064589 A1 | 4/2020 |
| WO | WO-2020077694 A1 * | 4/2020 ............ G06N 3/084 |
| WO | 2020127004 A1 | 6/2020 |

OTHER PUBLICATIONS

Quick Roughness Evaluation of Cut Edges using a Convolutional Neural Network, Stahl et al., 2019.*
Bach et al: "On Pixel-Wise Explanations for Non-Linear Classifier Decisions by Layer—Wise Relevance Propagation" PLOS ONE, US, vol. 10, No. 7, Jan. 1, 2015 (Jan. 1, 2015), DOI: 10.1371/journal.pone.O130140, ISSN: 1932-6203, XP055228790.
Stahl et al: "Quick roughness evaluation of cut edges using a convolutional neural network", SPIE Proceedings; [Proceedings of SPIE ISSN 0277-786X], SPIE, US, vol. 11172, Jul. 16, 2019 (Jul. 16, 2019), pp. 111720P-111720P, DOI: 10.1117/12.2519440, ISBN: 978-1-5106-3673-6, XP060124902.
Petring et al: "Some answers to frequently asked questions and open issues of laser beam cutting", International Congress on Applications of Lasers & Electro-Optics. ICALEOR, Laser Institute of America, (2012), pp. 43-48.
Lecun et al.: "Deep learning", Nature, (2015), vol. 521, pp. 436-444, XP055574086 DOI: http://dx.doi.org/10.1038/nature14539.
Lin et al.: "Automated defect inspection of LED chip using deep convolutional neural network", Journal of Intelligent Manufacturing (Mar. 29, 2018), vol. 30, doi:10.1007/s10845-018-1415-x, pp. 2525-2534, XP036830977.
Fu et al.: "A deep-learning-based approach for fast and robust steel surface defects classification", Optics Laser in Engineering, 121, (2019), pp. 397-405.
Lee et al.: "A Convolutional Neural Network for Fault Classification and Diagnosis in Semiconductor Manufacturing Processes", IEEE Transactions on Semiconductor Manufacturing, (Mar. 1, 2017), vol. 30, doi: 10.1109/TSM.2017.2676245, XP011647960.
Goncalves et al.: "A convolutional neural network approach on bead geometry estimation for a laser cladding system", The International Journal of Advanced Manufacturing Technology 106 (5-6):1-11 (Jan. 11, 2020) DOI 10.1007/00170-019-04669-z.
Karatas et al.: "Development of a Convolutional Autoencoder using deep neuronal networks for defect detection and generating ideal references for cutting edges" Munich, Germany, Proc. of SPIE vol. 11056 (2019) DOI 10.1117/12.2525882.
Samek et al.: "Evaluating the Visualization of What a Deep Neural Network Has Learned", IEEE Transactions on Neural Networks and Learning Systems 28(11):2660-2673 (2017), DOI 10.1109/ TNNLS.2016.2599820.
Montavon et al: Explaining NonLinear Classification Decisions with Deep Taylor Decomposition; Pattern Recognition 65 (2017) 211-222, DOI 10.1016/j. patcog.2016.11.008.
Montavon et al.: "Explaining NonLinear Classification Decisions with Deep Taylor Decomposition" arXiv preprint (Dec. 8, 2015) URL https://arxiv.org/pdf/1512.02479.pdf.
Montavon et al.: "Layer-Wise Relevance Propagation: An Overview" Sep. 2019, In book: Explainable AI: Interpreting, Explaining and Visualizing Deep Learning (pp. 193-209) DOI:10.1007/978-3-030-28954-6_101 Springer, Cham, Switzerland (2019).
Abadi et al.: "TensorFlow: Large-Scale Machine Learning on Heterogeneous Distributed Systems" arXiv preprint (Mar. 16, 2016), URL https://arxiv.org/pdf/1603.04467.pdf.
Keras 2.2.4 (see Chollet F (2015) Keras), URL https://keras.io).
Alber et al.: "iNNvestigate neural networks!", Journal of Machine Leaning Research 20 (2019), 1-8.
Steen et al.: "Laser Material Processing", Fourth Edition, Springer Verlag, 2010-e-ISBN 978-1-84996-062-5.
Huegel et al.: "Laser in der Fertigung: Strahlquellen, Systeme, Fertigungsverfahren", [Laser in manufacturing: beam, sources, systems, manufacturing methods], Wiesbaden: Vieweg + Teubner, 2009—English abstract.

* cited by examiner

METHOD AND DEVICE FOR DEMONSTRATING THE INFLUENCE OF CUTTING PARAMETERS ON A CUT EDGE

CROSS-REFERENCE TO RELATED APPLICATION

This application is a continuation, under 35 U.S.C. § 120, of copending International Patent Application PCT/EP2021/077086, filed Oct. 1, 2021, which designated the United States; this application also claims the priority, under 35 U.S.C. § 119, of German Patent Application DE 10 2020 212 510.4, filed Oct. 2, 2020; the prior applications are herewith incorporated by reference in their entirety.

FIELD AND BACKGROUND OF THE INVENTION

The invention relates to a method for analyzing a cut edge created by a machine tool. The invention furthermore relates to a computer program product and a device for carrying out the method.

It is known to optimize the cutting of workpieces. By way of example, DE 10 2017 105 224 A1 discloses the use of a neural network in order to regulate a laser cutting process.

However, most cutting processes or the influences of cutting parameters on the cut edges are not fully understood. This can be inferred from the following articles, for example:

Hügel, H., Graf, T. Laser in der Fertigung: Strahlquellen, Systeme, Fertigungsverfahren [Lasers in manufacturing: beam sources, systems, manufacturing methods]. Wiesbaden: Vieweg+Teubner, 2009.

Petring, D., Schneider, F., Wolf, N. Some answers to frequently asked questions and open issues of laser beam cutting. In: International Congress on Applications of Lasers & Electro-Optics. ICALEOR 2012, Anaheim, California, USA: Laser Institute of America, 2012, pages 43-48

Steen, W. M., Mazumder, J. Laser Material Processing. London: Springer London, 2010.

Even experienced users of the cutting apparatuses generally cannot predict how the cutting parameters will affect the appearance of the cut edge. In order to improve the appearance of a cut edge, in particular in the case of problems on account of changed material quality and/or in the case of new processes using a new laser source, new sheet metal thickness, etc., it is therefore necessary regularly to carry out complicated test series with cutting parameters varied in different ways.

SUMMARY OF THE INVENTION

Against this background, it is an object of the invention to provide a method, a computer program product and a device which are able to analyze the influence of the cutting parameters on the cut edge.

DESCRIPTION OF THE INVENTION

This object is achieved according to the invention by a method as claimed, a computer program product as claimed, and a device as claimed. The dependent claims present preferred developments.

The object according to the invention is thus achieved by a method in which a recording of a cut edge created by a machine tool, said recording having a plurality of recording pixels, is read in. An algorithm having a neural network is used to determine at least one cutting parameter, in particular a plurality of cutting parameters, from the recording. This is followed by a backpropagation in the neural network to ascertain the relevance of the individual recording pixels for ascertaining the previously determined cutting parameters. The recording is then output with at least some recording pixels being marked, the marking reflecting the previously ascertained relevance of the recording pixels. Preferably, all the recording pixels are output and marked in accordance with their relevance.

Consequently, a user immediately discerns from the marked output the extent to which the respective regions of the cut edge were influenced by the respective cutting parameter or the respective cutting parameters, and can then perform an adaptation of said cutting parameter or said cutting parameters in order to change a specific region of the cut edge in a targeted manner.

The backpropagation of a neural network was disclosed by EP 3 654 248 A1, for example, the content of which is incorporated by reference in its entirety in the present description.

Such a backpropagation ("backpropagation-based mechanisms") is usually used only to check whether a neural network has learned the correct relationships. In this context, there are neural networks which do not have "superhuman performance". In this case, a human has no problems in being able to assess what the correct information is. For example, it is thus possible to examine whether a neural network which can differentiate dogs from cats actually recognizes a dog in an image when it indicates the presence of a dog, and is not considering the meadow in which the dog is standing. By way of example, it can happen that instead of recognizing a specific animal (e.g. a horse) in an image, the neural network recognizes lettering in the image that can be seen in all images of horses (so-called "Clever Hans problem"). In the present case, by contrast, backpropagation is used in order to understand or at least be able to predict production processes or physical relationships during the cutting process.

In this case, a neural network is understood to mean an architecture having at least one data aggregation routine, in particular a plurality of data aggregation routines. A data aggregation routine can be designed to aggregate a plurality of "determined data" to form a new data packet. The new data packet can comprise one or more numbers or vectors. Further data aggregation routines can be made available to the new data packet fully or in part as "determined data". "Determined data" can be in particular cutting parameters or data packets made available by one of the data aggregation routines. Particularly preferably, the architecture is configured with a plurality of connected data aggregation routines. In particular, hundreds, in particular thousands, of such data aggregation routines can be connected to one another. The quality of the neural network is significantly improved as a result.

In this case, the architecture can have a function with weighted variables. One data aggregation routine, in particular a plurality of data aggregation routines, particularly preferably all data aggregation routines, can be designed to combine, in particular to multiply, each of a plurality of "determined data" with, or by, a weighted variable and thus to convert the "determined data" into "combined data" so as then to aggregate, in particular to add, the "combined data" to form a new data packet. In the neural network, data can be multiplied by weights. The information of a plurality of neurons can be added. Furthermore, the neural network can have a nonlinear activation function.

The cut edge features contained in the recording can in this case themselves be data packets, in particular a plurality of structured data, in particular data vectors or data arrays, which can themselves again constitute "determined data", in particular for the data aggregation routines.

For determining suitable weighted variables, i.e. for training the neural network, it is possible to run through the method with data, in particular cutting parameters, whose association with recordings is known in each case.

The neural network here is preferably configured in the form of a convolutional neural network (CNN) having a plurality of layers. The convolutional neural network can have convolutional layers and pooling layers. Pooling layers are typically arranged between two successive convolutional layers. As an alternative or in addition thereto, a pooling can be carried out after each convolution.

In addition to the convolutional layers and pooling layers, a CNN can have fully connected layers, in particular right at the end of the neural network. The convolutional layers and pooling layers extract features, and the fully connected layers can assign the features to the cutting parameters.

The neural network can have a plurality of filters per layer. The structure of a convolutional neural network can be gathered for example from the following articles, in particular the first one mentioned below:

LeCun Y, Bengio Y, Hinton G (2015) Deep learning; Nature 521:436{444, DOI 10.1038/nature14539;

Lin H, Li B, Wang X, Shu Y, Niu S (2019); Automated defect inspection of LED chip using deep convolutional neural network; J Intell Manuf; 30:2525{2534, DOI 10.1007/s10845-018-1415-x;

Fu G, Sun P, Zhu W, Yang J, Cao Y, Yang M Y, Cao Y (2019); A deep-learning-based approach for fast and robust steel surface defects classification; Opt Laser Eng 121: 397{405, DOI 10.1016/j.optlaseng.2019.05.005;

Lee K B, Cheon S, Kim C O (2017) A Convolutional Neural Network for Fault Classification and Diagnosis in Semiconductor Manufacturing Processes; IEEE T Semiconduct M 30:135{142, DOI 10.1109/TSM.2017.2676245;

Gonçalves D A, Stemmer M R, Pereira M (2020) A convolutional neural network approach on bead geometry estimation for a laser cladding system; Int J Adv Manuf Tech 106:1811{1821, DOI 10.1007/s00170-019-04669-z;

Karatas A, Kölsch D, Schmidt S, Eier M, Seewig J (2019) Development of a convolutional autoencoder using deep neuronal networks for defect detection and generating ideal references for cutting edges; Munich, Germany, DOI 10.1117/12.2525882;

Stahl J, Jauch C (2019) Quick roughness evaluation of cut edges using a convolutional neural network; In: Proceedings SPIE 11172, Munich, Germany, DOI 10.1117/12.2519440.

For backpropagation, layer-wise relevance propagation (LRP) has proved to be implementable particularly targetedly and at the same time in a simple manner. Layer-wise relevance propagation can be gathered in particular from the following articles:

Bach S, Binder A, Montavon G, Klauschen F, Müller K R, Samek W (2015) On Pixel-Wise Explanations for NonLinear Classifier Decisions by Layer-Wise Relevance Propagation; PLoS ONE 10:e0130140, DOI 10.1371/journal.pone.0130140;

W Samek, A Binder, G Montavon, S Lapuschkin, K Müller (2017) Evaluating the Visualization of What a Deep Neural Network Has Learned. IEEE T Neur Net Lear 28:2660{2673, DOI 10.1109/TNNLS.2016.2599820;

Montavon G, Lapuschkin S, Binder A, Samek W, Müller K R (2017) Explaining NonLinear Classification Decisions with Deep Taylor Decomposition; Pattern Recognition 65:211{222, DOI 10.1016/j.patcog.2016.11.008;

Montavon G, Lapuschkin S, Binder A, Samek W, Müller K R (2015) Explaining NonLinear Classification Decisions with Deep Taylor Decomposition; arXiv preprint URL https://arxiv.org/pdf/1512.02479.pdf;

Montavon G, Binder A, Lapuschkin S, Samek W, Müller K R (2019) Layer-Wise Relevance Propagation: An Overview. In: Samek W, Montavon G, Vedaldi A, Hansen L K, Müller K R (eds) Explainable AI: Interpreting, Explaining and Visualizing Deep Learning, Springer, Cham, Switzerland, pp 193{209.

Backpropagation, in particular in the form of layer-wise relevance propagation, is preferably based on deep Taylor decomposition (DTD). Deep Taylor decomposition can be gathered in particular from the following article:

Montavon G, Lapuschkin S, Binder A, Samek W, Müller K R (2017) Explaining NonLinear Classification Decisions with Deep Taylor Decomposition; Pattern Recognition 65:211{222, DOI 10.1016/j.patcog.2016.11.008.

The implementation can be effected for example in Python in the form of the libraries TensorFlow 1.13.1 (see Abadi M, Agarwal A, Barham P, Brevdo E, Chen Z, Citro C, Corrado G, Davis A, Dean J, Devin M, Ghemawat S, Goodfellow I, Harp A, Irving G, Isard M, Jia Y, Jozefowicz R, Kaiser L, Kudlur M, Zheng X (2016) TensorFlow: Large-Scale Machine Learning on Heterogeneous Distributed Systems. arXiv preprint URL https://arxiv.org/pdf/1603.04467.pdf) and Keras 2.2.4 (see Chollet F (2015) Keras. URL https://keras.io). Furthermore, it is possible to use the Python library "iNNvestigate" (Alber, M., et al.: iNNvestigate neural networks!. J. Mach. Learn. Res. 20(93), 1-8 (2019)).

With further preference, the outputting is effected in the form of a heat map. The heat map can have two colors, in particular red and blue, which respectively identify particularly relevant and particularly irrelevant recording pixels. Recording pixels of average relevance can be identified by intermediate shades between the two colors or gray. As a result, the output is understandable particularly intuitively.

The recording is preferably a photograph, particularly preferably a color photograph, in particular in the form of an RGB photograph, or a 3D point cloud. 3D point clouds are somewhat more complicated to create since they include depth information. The depth information can be obtained during the creation of the recording in particular by means of light section or by means of triangulation from different angles. However, it has been found that color photographs are particularly suitable or sufficient since the various cutting parameters are recognized by the neural network primarily from the different colorations of the cut edge.

The recording can be created by a photographic and/or video camera. Preferably, the camera is part of the machine tool in order to ensure a constant recording situation. As an alternative or in addition thereto, the camera can be part of a photo booth in order to reduce ambient influences during the creation of the recording.

With further preference, the method according to the invention comprises creating the cut edge by means of the machine tool. The cutting method of the machine tool can be a thermal cutting method, in particular a plasma cutting method, preferably a laser cutting method.

The cutting parameters determined in the case of a laser cutting method preferably comprise beam parameters, in particular focus diameter and/or laser power; transport parameters, in particular focus position, nozzle-focus distance and/or feed; gas dynamics parameters, in particular gas pressure and/or nozzle-workpiece distance; and/or material parameters, in particular degree of gas purity and/or melting point of the workpiece. These cutting parameters have proved to be particularly formative for the appearance of the cut edge.

The object according to the invention is furthermore achieved by a computer program product for carrying out the computation operations described here. The computer program product can be configured in partly, in particular fully, cloud-based fashion in order to enable a plurality of users to have access to the computer program product. Furthermore, more comprehensive training of the neural network can be effected by a plurality of users.

Finally, the object according to the invention is achieved by a device for carrying out the method described here, wherein the device comprises the machine tool, in particular in the form of a laser cutting machine.

In this case, the device can comprise the camera described here.

Further advantages of the invention are evident from the description and the drawing. Likewise, according to the invention, the features mentioned above and those that will be explained still further can be used in each case individually by themselves or as a plurality in any desired combinations. The embodiments shown and described should not be understood as an exhaustive enumeration, but rather are of exemplary character for outlining the invention.

Other features which are considered as characteristic for the invention are set forth in the appended claims.

Although the invention is illustrated and described herein as embodied in a method and device for demonstrating the influence of cutting parameters on a cut edge, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
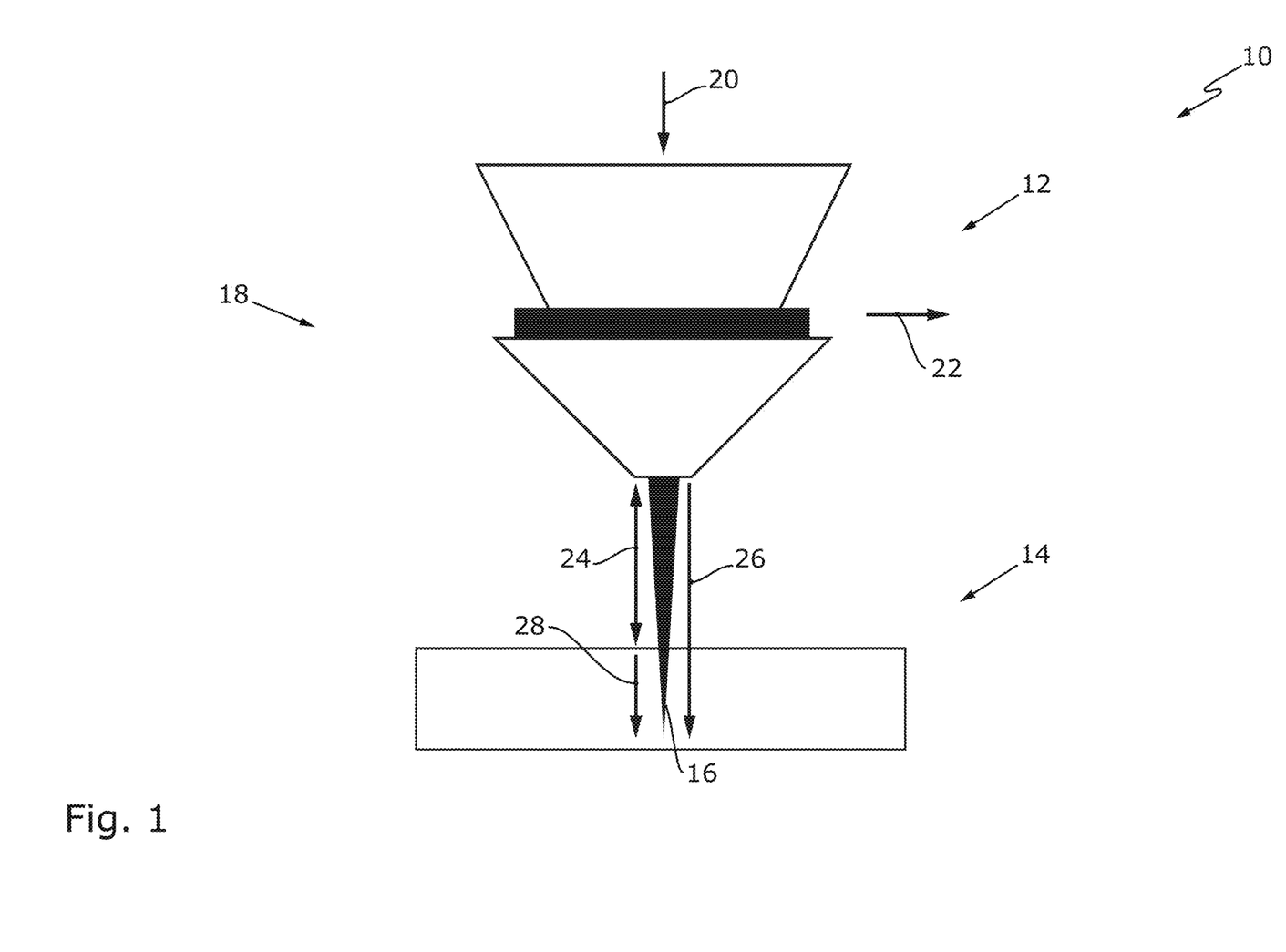
FIG. 1 shows a schematic illustration of a machine tool in the form of a laser cutting machine for elucidating essential cutting parameters.

FIG. 1 shows part of a machine tool 10 in the form of a laser cutting machine. In this case, a cutting head 12 passes over a workpiece 14 with the workpiece 14 being subjected to laser irradiation and exposure to gas. A cut edge 16 is produced in the process. The cut edge 16 is influenced in particular by the following cutting parameters 18: gas pressure 20, feed 22, nozzle-workpiece distance 24, nozzle-focus distance 26 and/or focus position 28.

The influence of the individual cutting parameters 18 on the appearance of the cut edge 16 obtained is to a very great extent unclear even to experts. If striation occurs on the cut edge 16, for example, the cutting parameters 18 must be varied until the striation disappears, in which case, firstly, the variation is associated with high consumption of material and energy and expenditure of time and, secondly, it often happens that new artefacts are produced by the variation. There is therefore the need to provide a method and a device by which cutting parameters 18 are assigned to the features of a cut edge 16 in a targeted manner. These cutting parameters 18 can then be changed in order to change the feature of the cut edge 16. The invention therefore solves a problem which cannot be solved by human users on account of the complexity of the problem ("superhuman performance").

Figure 2:
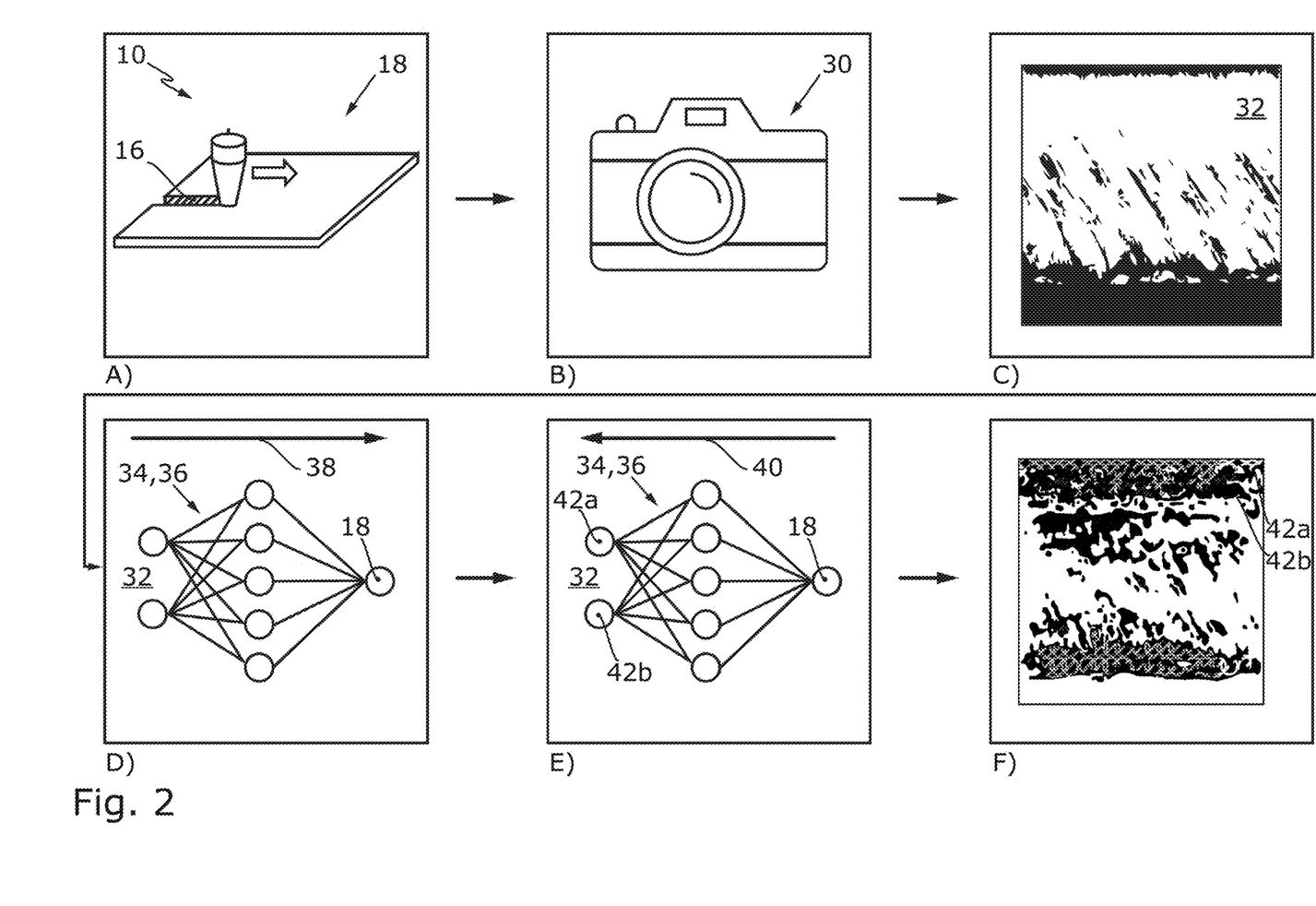
FIG. 2 shows a schematic overview of the method according to the invention comprising the following method steps:
  Section A shows the step of creating the cut edge with a plurality of cutting parameters;
  A) creating a recording of the cut edge;
  B) reading in the recording;
  C) analyzing the recording by means of a neural network for determining the cutting parameters;
  D) backpropagation of the neural network for determining the relevance of the recording pixels with respect to the determined cutting parameters; and
  E) identified representation of the relevant and/or irrelevant recording pixels.

FIG. 2 shows an overview of the method according to the invention. In method step A), the cut edge 16 is produced by the machine tool 10 using the cutting parameters 18. In method step B), the cut edge 16 (see method step A)) is recorded using a camera 30. The camera 30 can be configured in the form of a photographic camera and/or a video camera. In method step C), the created recording 32 is read in. In method step D), the recording 32 is analyzed by an algorithm 34. The algorithm 34 has a neural network 36. The neural network 36 serves for determining 38 the cutting parameters 18. The determined cutting parameters 18 can be compared with the set cutting parameters 18 (see method step A)), for example in order to determine a defect of the machine tool 10 (see method step A)).

In method step E), the algorithm 34 effects a backpropagation 40 in the neural network 36. The backpropagation 40 of the cutting parameters 18 with respect to the recording 32 establishes the relevance of individual recording pixels 42a, 42b of the recording 40 when determining the cutting parameters 18 in method step D). In method step F), the recording pixels 42a, b are represented (only the recording pixels 42a, b being provided with a reference sign in FIG. 2, for reasons of clarity) and their respective relevance is identified. In the present case, the particularly relevant recording pixel 42a is identified using a first color (for example red) and the particularly irrelevant recording pixel 42b is identified using a second color (for example blue or gray). Owing to formal stipulations, the different colors are represented by different patterns (hatchings) in the present description. On the basis of the particularly relevant recording pixels 42a, a user can directly recognize which regions of the recorded cut edge 16 (see method step A)) are particularly influenced by the cutting parameter 18 respectively determined (see method step D)).

Figure 3:
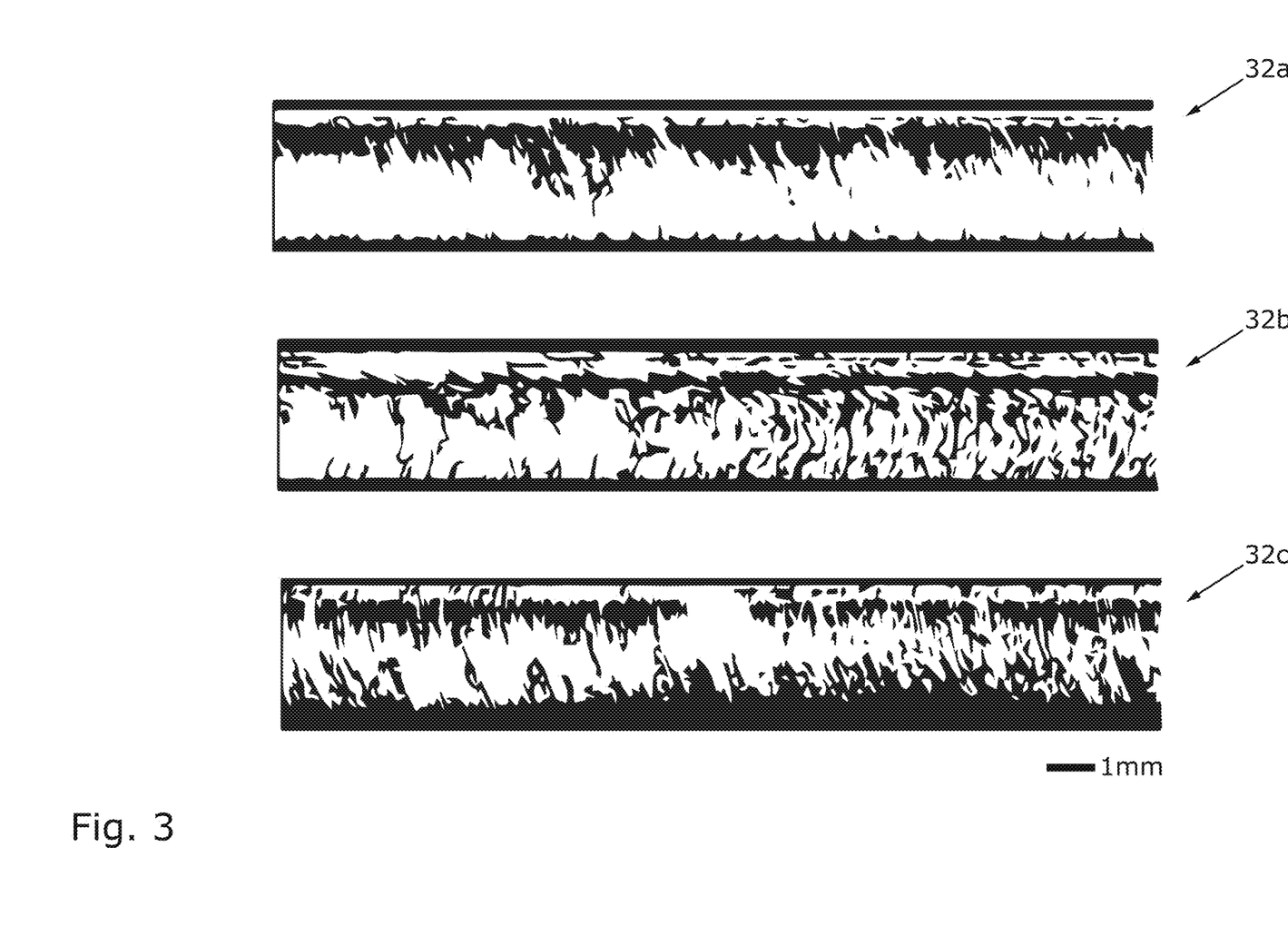
FIG. 3 shows recordings of various cut edges.

FIG. 3 shows by way of example three recordings 32a, 32b, 32c, the recordings 32a-c having been created with different cutting parameters 18 (see FIG. 1):

| recording 32a: | gas pressure 20 | 15 bar |
| | feed 22 | 21 m/min |
| | nozzle-workpiece distance 24 | 1.5 mm |
| | nozzle-focus distance 26 | −2 mm |

By comparison therewith, recording 32b was created with an increased nozzle-focus distance 26. Recording 32c was created with a reduced feed 22 by comparison with recording 32a. It is evident from FIG. 3 that the influence of the cutting parameters 18 (see FIG. 1) is not directly inferable from the recordings 32a-c for human users.

Figure 4:
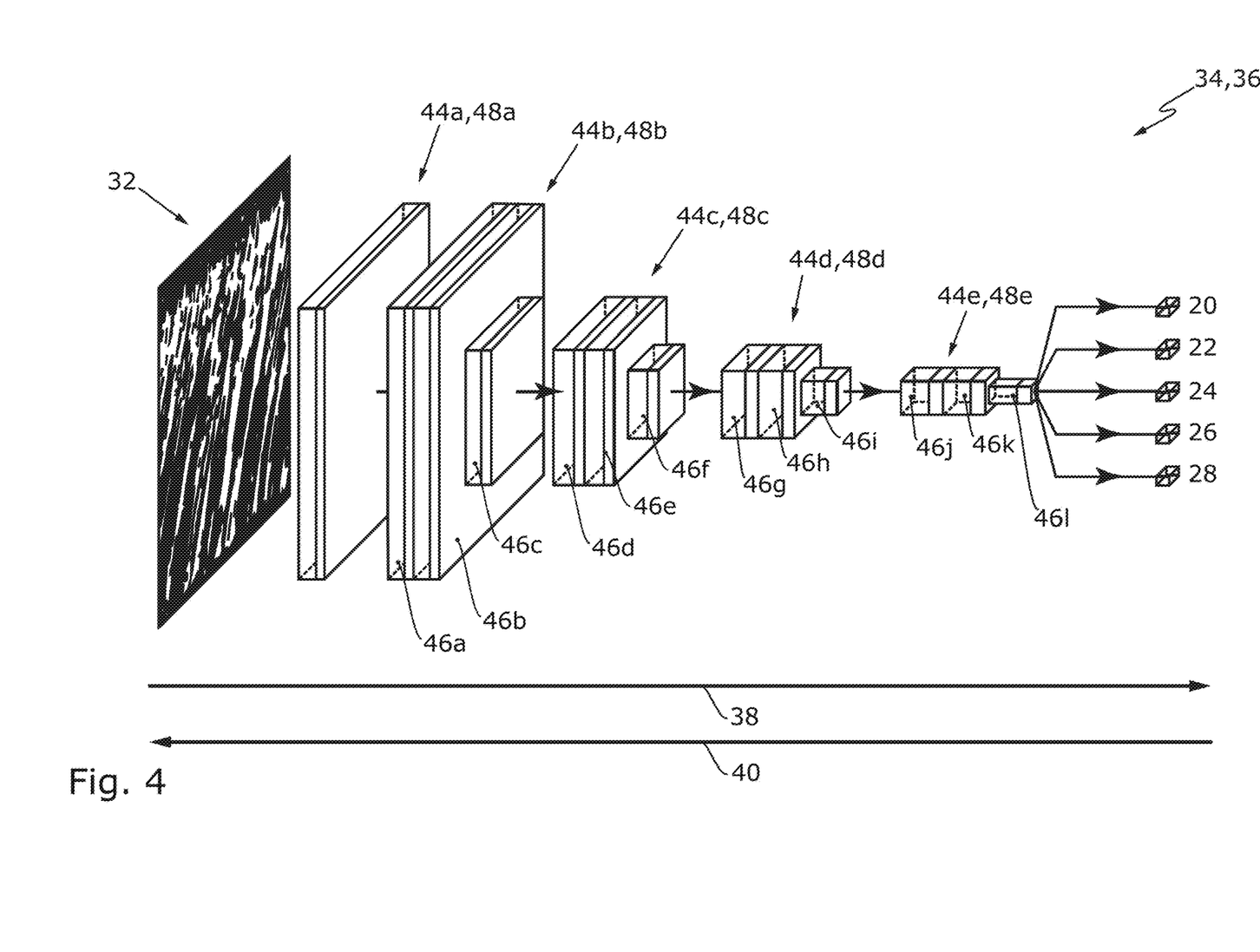
FIG. 4 schematically shows the functioning of the neural network or more specifically of the backpropagation.

FIG. 4 schematically shows the algorithm 34 or more specifically the neural network 36. The neural network 36 is constructed in the form of a convolutional neural network having a plurality of blocks 44a, 44b, 44c, 44d, 44e. In this case, an input block 44a is provided. The blocks 44b-e each have three convolutional layers 46a, 46b, 46c, 46d, 46e, 46f, 46g, 46h, 46i, 46j, 46k, 46l. The blocks 44a-e have filters 48a, 48b, 48c, 48d, 48e. Each layer of the input block 44a has 32 filters 48a. The layers of the block 44b likewise have 32 filters 48b. The layers of the block 44c have 64 filters 48c. The layers of the block 44d have 128 filters 48d and the layers of the block 44e have 256 filters 48e. The filters 48a-e can result in a reduction of the resolution of the recording 32 (e.g. from 200 pixels×200 pixels to 7 pixels×7 pixels) with at the same time an increase in the depth (or number of channels). The filters 48a-e of the third layer of each block 44a-e result in a reduction of the resolution. Convolutional layers are used here for the pooling as well. The depth increases from one block 44a-e to the next. By way of example, the block 44b consists of three convolutional layers, each having 32 filters. In the first two, the spatial resolution is 112×112 pixels. From the second to the third, the spatial resolution decreases from 112×112 pixels to 56×56 pixels. Upon the transition from block 44b (last layer) to block 44c (first layer), the depth increases from 32 to 64. The spatial resolution remains constant.

The neural network 36 thereby enables determining 38 of the cutting parameters 18. In the present case, layer-wise relevance propagation is used in the backpropagation 40. The results of this are illustrated in FIG. 5.

Figure 5:
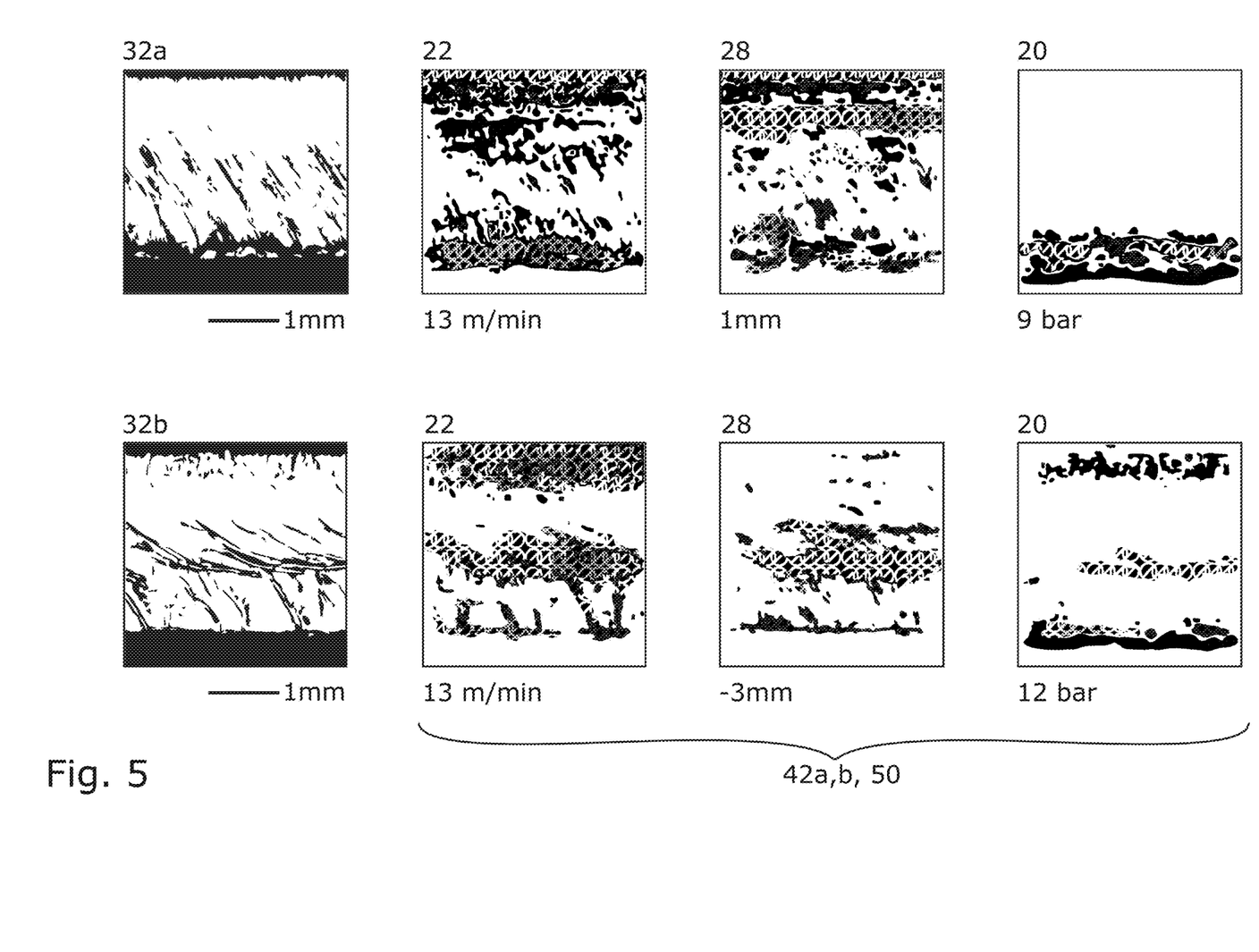
FIG. 5 shows, in the left-hand column, recordings of two cut edges and, in the further columns, determined cutting parameters and outputs of the recordings with highlighting of the recording pixels that are relevant for the determined cutting parameters.

FIG. 5 shows the recording 32a in the upper column and the recording 32b in the lower column. The recordings 32a, b are reproduced a number of times in each column, the recording pixels 42a, b influenced greatly or little by the feed 22 being highlighted in the second column, the recording pixels 42a, b influenced greatly or little by the focus position 28 being highlighted in the third column, and the recording pixels 42a, b influenced greatly or little by the gas pressure 20 being highlighted in the fourth column. In this case, the outputs 50 can be present in the form of heat maps.

The recording pixels 42b influenced particularly little by the respective cutting parameter 18 (see FIG. 1) serve primarily for checking the plausibility of the outputs 50. Preferably, in the outputs 50, only the recording pixels 42a influenced particularly greatly by the respective cutting parameter 18 (see FIG. 1) are highlighted in order to facilitate handling of the outputs 50 for a user.

Taking all the figures of the drawing jointly into consideration, the invention relates in summary to a method for recognizing cutting parameters 18 which are particularly important for specific features of a cut edge 16. In this case, a recording 32, 32a-c of the cut edge 16 is analyzed by an algorithm 34 having a neural network 36 for determining 38 the cutting parameters 18. Those recording pixels 42a, b which play a significant part for ascertaining the cutting parameters 18 are identified by backpropagation 40 of this analysis. An output 50 in the form of a representation of these significant recording pixels 42a, b, in particular in the form of a heat map, demonstrates to a user of the method which cutting parameters 18 need to be changed in order to improve the cut edge 16. The invention furthermore relates to a computer program product and respectively a device for carrying out the method.

The following is a summary list of reference numerals and the corresponding structure used in the above description of the invention:
- 10 Machine tool
- 12 Cutting head
- 14 Workpiece
- 16 Cut edge
- 18 Cutting parameters
- 20 Gas pressure
- 22 Feed
- 24 Nozzle-workpiece distance
- 26 Nozzle-focus distance
- 28 Focus position
- 30 Camera
- 32, 32a-c Recording
- 34 Algorithm
- 36 Neural network
- 38 Determining the cutting parameters 18
- 40 Backpropagation
- 42a, b Recording pixels
- 44a-e Blocks of the neural network 36
- 46a-l Layers of the neural network 36
- 48a-e Filters of the neural network 36
- 50 Output

The invention claimed is:

1. A method for analyzing a cut edge created by a machine tool, the method comprising the following steps:
   creating the cut edge with the machine tool, the cut edge having at least one feature based on cutting parameters;
   reading in at least one recording of the cut edge, the recording having a multiplicity of recording pixels;
   analyzing the recording by way of a trained neural network for determining at least one cutting parameter;
   analyzing a backpropagation of the neural network for determining a relevance of the recording pixels for ascertaining the determined cutting parameters;
   outputting the recording with identification of at least one of particularly relevant recording pixels or particularly irrelevant recording pixels, and adapting said at least one cutting parameter to change the at least one feature of the cut edge.

2. The method according to claim 1, wherein the trained neural network is a convolutional neural network having a plurality of layers.

3. The method according to claim 2, wherein each of the plurality of layers have a plurality of filters.

4. The method according to claim 1, wherein the backpropagation is a layer-wise relevance propagation.

5. The method according to claim 4, wherein an assignment of the relevance in the layer-wise relevance propagation is based on deep Taylor decomposition.

6. The method according to claim 1, wherein the identification of the particularly relevant and/or particularly irrelevant recording pixels is outputted as a heat map.

7. The method according to claim 1, wherein the recording is an RGB photograph or a 3D point cloud.

8. The method according to claim 1, further comprising creating the recording via a camera.

9. The method according to claim 8, wherein the camera is a camera of the machine tool.

10. The method according to claim 1, wherein the machine tool is a laser cutting machine.

11. The method according to claim 10, wherein the at least one cutting parameter is:
   beam parameters;
   transport parameters;
   gas dynamics parameters; and/or
   material parameters.

12. The method according to claim 11, wherein the beam parameters are a focus diameter and/or laser power.

13. The method according to claim 11, wherein the transport parameters are focus position, nozzle-focus distance and/or feed.

14. The method according to claim 11, wherein the gas dynamics parameters are gas pressure and/or nozzle-workpiece distance.

15. The method according to claim 11, wherein the materials parameter are degree of gas purity and/or melting point of the workpiece.

16. A device, comprising:
   a machine tool configured for creating a cut edge, the cut edge having at least one feature based on cutting parameters;
   a camera configured for creating at least one recording of the cut edge, the recording having a multiplicity of recording pixels;
   a computer configured to
      analyze the recording by way of a trained neural network for determining at least one cutting parameter,
      analyze a backpropagation of the neural network for determining a relevance of the recording pixels for ascertaining the determined cutting parameters, and
      output the recording with identification of at least one of particularly relevant recording pixels or particularly irrelevant recording pixels; and
   said machine tool being configured for receiving an adapted cutting parameter to change the at least one feature of the cut edge based on the identification of the at least one particularly relevant recording pixel or particularly irrelevant recoding pixels.

17. The device according to claim 16, wherein the machine tool is a laser cutting machine.

* * * * *